US008375358B2

(12) United States Patent
Baldwin et al.

(10) Patent No.: US 8,375,358 B2
(45) Date of Patent: Feb. 12, 2013

(54) AUTOMATICALLY GENERATING REST CLIENTS FROM REST RESOURCES

(75) Inventors: Jennifer E. Baldwin, Victoria (CA);
Jonathan D. E. Ball, Ottawa (CA);
Giselle Jean Baptiste, Ottawa (CA);
Elijah El-Haddad, Ottawa (CA);
Mihnea Galeteanu, Toronto (CA);
Randolph P. Giffen, Kemptville (CA);
Han Xu, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 1415 days.

(21) Appl. No.: 12/022,270

(22) Filed: Jan. 30, 2008

(65) Prior Publication Data
US 2009/0193393 A1    Jul. 30, 2009

(51) Int. Cl.
*G06F 9/44* (2006.01)
(52) U.S. Cl. .......................... 717/114; 717/115
(58) Field of Classification Search .................. None
See application file for complete search history.

(56) References Cited

U.S. PATENT DOCUMENTS

| 7,269,792 | B2 | 9/2007 | Consollati et al. | |
| 7,441,188 | B1* | 10/2008 | Russell et al. | 715/273 |
| 7,774,335 | B1* | 8/2010 | Scofield et al. | 707/709 |
| 2006/0184540 | A1* | 8/2006 | Kung et al. | 707/10 |
| 2007/0038756 | A1* | 2/2007 | Waldorf et al. | 709/227 |
| 2007/0038934 | A1 | 2/2007 | Fellman | |
| 2007/0061486 | A1 | 3/2007 | Trinh et al. | |
| 2007/0078953 | A1 | 4/2007 | Chai et al. | |
| 2007/0186156 | A1 | 8/2007 | Bagare et al. | |
| 2008/0201234 | A1* | 8/2008 | Castro et al. | 705/26 |

* cited by examiner

*Primary Examiner* — Li B Zhen
*Assistant Examiner* — Lenin Paulino
(74) *Attorney, Agent, or Firm* — Patents on Demand P.A.; Brian K. Buchheit; Scott M. Garrett

(57) ABSTRACT

The present invention discloses a method and system for creating REST clients using existing REST export information. The invention can provide a wizard able to dynamically generate REST client code. The REST client code can include source code, such as HTML and JAVA SCRIPT starting points that can be further configured by the REST client code recipient. In one embodiment, the automatically created REST client can be a GUI client able to be rendered within a browser. The REST client can include one or more sections, each associated with a particular REST resource. Each resource specific section can include fields for specifying values of each resource parameter. Suitable GUI controls can be associated with each of the fields such as using a checkbox for a Boolean field and a drop down list for an enumerated field.

19 Claims, 4 Drawing Sheets

AUTOMATICALLY GENERATING REST CLIENTS FROM REST RESOURCES

BACKGROUND OF THE INVENTION

1. Field of the Invention

The present invention relates to the field of Web services and, more particularly, to automatically generating REST clients from REST resources.

2. Description of the Related Art

Many companies have begun exposing their Web services in a form of Representational State Transfer (REST) services. Each of the rest services is a URL addressed resource. Users can query these exposed resources through HTTP methods, such as GET and POST. REST calls return a response, which are often formatted in eXtensible Markup Language (XML).

One way to interact with the REST resource is to dynamically build a URL with URL parameters to query the exposed resource; an example of which is shown in FIG. 1 (Prior Art). Specifically, FIG. 1 shows a URL 110 that queries YAHOO!'s Geocoding API. The URL 110 includes a base URI portion 112 and a query portion 114. The query portion 114 can specify values 118 for parameters. The URI portion 112 identifies the REST resource. The URL 110 can cause a related Web service to return results 120. Standard Web browsers include features to be able to specify the URL 110 and to view results 120.

Obvious problems exist with accessing a Web service by entering a URL into a Web browser including: a user must have the technical knowledge to specify URL's and URL parameters, a user must know the URL of a REST resource, a user must know what parameters can be specified for the REST resource, a user must know a proper means for specifying parameter values. Another less obvious problem is that a typical Web browser can fail to support all REST methods, such as PUT, POST, and DELETE methods.

A way around these problems is to develop a REST client to interface with a set of one or more REST resources. At present developers must manually create code of a Web client. In order to create a REST client, a developer must look up details on the use of the Web service exposed as a REST resource, to read documentation concerning the service, and then to painstakingly create Web clients specifically designed to submit user input/commands to the Web service and designed to present service results within the client. Accordingly, designing a REST client consumes developer time, which incurs a cost.

BRIEF SUMMARY OF THE COMPUTER PROGRAM PRODUCT

The present invention discloses a method and system for creating REST clients using existing REST export information. For example, a client creation wizard can be included in a software development tool. When the wizard is selected for a specific Web service, REST client code can be dynamically generated and made available to a wizard user for deployment of the user's server/client. The REST client code can include source code, such as HTML and JAVA SCRIPT starting points that can be further configured by the REST client code recipient. In one embodiment, the automatically created REST client can be a GUI client able to be rendered within a browser. The REST client can include one or more sections, each associated with a particular REST resource. Each resource specific section can include fields for specifying values of each resource parameter. Suitable GUI controls can be associated with each of the fields such as using a checkbox for a Boolean field and a drop down list for an enumerated field.

The present invention can be implemented in accordance with numerous aspects consistent with the material presented herein. For example, one aspect of the present invention can include software for interacting with a REST resource. The software can be configured to dynamically generate a graphical REST client given a REST resource.

Another aspect of the present invention can include a method for generating software that interacts with a REST resource. The method can include a step of identifying a REST resource that exposes functionality of a Web service. A request for an interface to remotely interact with the REST resource can be received. Responsive to the received request, at least one input parameter for the REST resource can be detected. Source code for a user interface for remotely interacting with the REST resource can be dynamically built. The source code can define at least one input element and can include an interface submission control. A selection of the interface submission control can cause user provided values entered into the input element to be submitted to the REST resource. The built source code can be conveyed to a remotely located computing device from which the request originated.

Still another aspect of the present invention can include a method of obtaining a dynamically generated REST client. In the method, a Hypertext Transfer Protocol (HTTP) request can be submitted to a server. The submitted request can specify a Web service exposed through a REST resource. The server can be configured to dynamically generate a REST client for interacting with the Web service upon receiving the request. Source code for the REST client can be received from the server. The source code can include HyperText Markup Language (HTML) and object-based, client side scripting language source code (e.g., JAVA SCRIPT code).

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE SEVERAL VIEWS OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
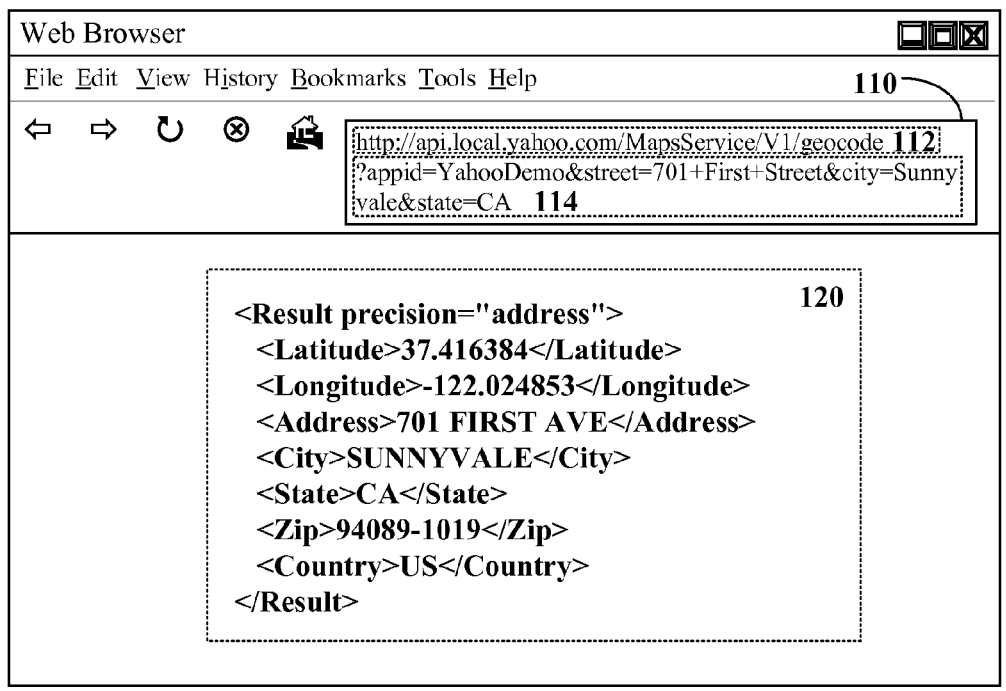
FIG. 1 shows an example of querying a REST service using a dynamically built Uniform Resource Locator (URL) entered into a Web browser.
Figure 2:
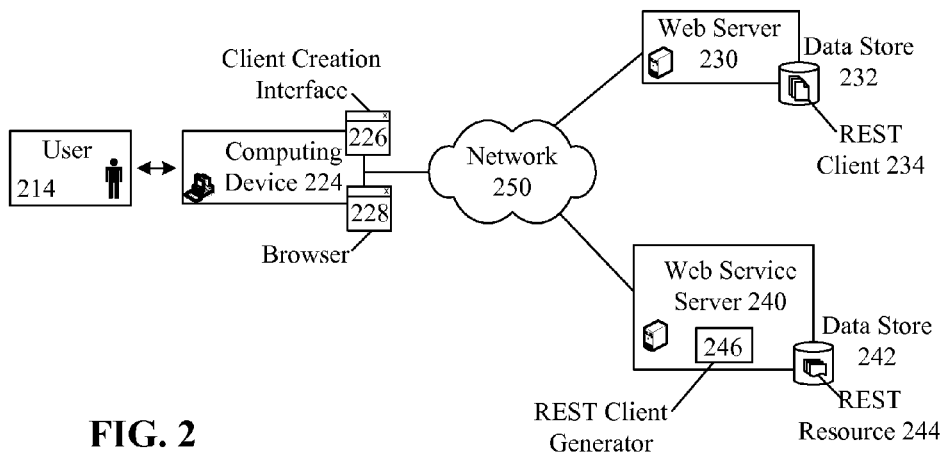
FIG. 2 is a schematic diagram illustrating system where a Representational State Transfer (REST) client generator is able to generate a REST client for at least one REST resource in accordance with an embodiment of the inventive arrangements disclosed herein.

FIG. 2 is a schematic diagram illustrating system 200 where a Representational State Transfer (REST) client generator 246 is able to generate a REST client 234 for at least one REST resource 244 in accordance with an embodiment of the inventive arrangements disclosed herein. In system 200, a user 214 of a computing device 224 can interact with a Web service server 240 over a network 250. An additional Web server 230 can also be connected to network 250, which is able to server REST clients 234. Each REST client 234 can be configured to permit users to interact with a REST resource 244.

More specifically, user 214 can use a client creation interface 226 to invoke a creation feature of the REST client generator 246 for a developer 214 selected resource 244. The generator 246 can dynamically generate source code for a REST client able to interact with the selected resource 244. The code can be conveyed to the computing device 244, which can be part of a software development platform. The user 214 is then able to modify the automatically generated code as desired. Afterwards, the user 214 can deploy the code for the REST client 235 upon a Web server 230, which can serve Web pages including ones containing the REST client 235 to authorized users.

Thus, software developers 214 can save significant development time over manually creating needed REST clients 234 from scratch. Further, less experienced developers 214 can use the REST client generator 246 to develop a usable REST client 234 even if they lack experience/knowledge to manually develop the client 234 on their own. Additionally, The Web service (exposed as a REST resource 244) owner is able to attract more customers to use their REST resources 244.

In fact, in one contemplated arrangement, the generator 246 can dynamically generate clients 234 for use by end-users 214 lacking software development skills. That is, an end user 214 wanting to use a REST resource 244 can use a standard Web browser 228 to interface with the Web service server 240. These interactions can indicate the user wants to use a feature of a REST resource 244, which causes the client generator 246 to create a REST client 234. This client can be a browser 228 displayable HTML form, which the user can utilize. In the end-user situation, the server 240 functions as a Web service server having HTML form creation abilities and as an HTML form server.

As used herein, REST refers generally to a technique for exposing a Web service as a URL addressable resource. A REST resource 244 need not respond to each of the basic REST primitive commands (e.g., GET, POST, PUT, and DELETE) but can be designed to only respond to a subset of these commands. For example, in any implementations, the REST client 234 need only respond to queries (e.g., GET) that produce displayable results. Of course, the REST client 234 created by generator 246 can be designed to issue other commands (POST, PUT, and DELETE) to a REST resource 244, which results in an insertion, update, or removal programmatic action respectively.

One implementation of system 200 can implement a more constrained version of REST, where several architectural constraints are imposed that are intended to enhance performance, scalability, and resource abstraction. These constraints can include a statelessness constraint, and cacheability constraint. The uniform interface constraint signifies that all resources present the same interface to clients. Statelessness signifies that servers keep no state on the client's behalf, so all requests must carry the pertinent session-oriented information. Caching means that clients or intermediaries are permitted to cache responses that servers mark as cacheable, which can greatly affect performance in a distributed environment and scalability.

The computing device 224 can be any device capable of interacting with the Web service server 240 and/or capable of executing a REST client 234. For example, the computing device 224 can include a personal computer, a server, a mobile telephone, an internet appliance, an Internet enabled consumer electronic device, a kiosk, an embedded computer system, and the like.

The client creation interface 226 can be any user interface, graphical, voice, multimodal, and the like, configured to submit a REST client generation request over network 250 to the Web service server. In one embodiment, the request can be an HTTP request. In another embodiment, a Web page served by server 240 can be rendered as the interface 226 and can permit REST client requests to be submitted.

The interface 228 can be any user interface, graphical, voice, multimodal, and the like, able to operate as a REST client to permit user 214 to interact with a Web service exposed by the REST resource 244. In one embodiment, the interface 228 can be a Web browser that renders REST client code 234 served to the browser 228 by a Web server 230. For example, the REST client 234 can be implemented as an HTML based form. In another embodiment, the interface 228 can be a Web enabled Widget or Gadget able function as a REST client 234. Additionally, the interface 228 can be an interface of a Rich Internet Application (RIA).

Network 250 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network 250 can include local components and data pathways necessary for communications to be exchanged among computing device components and between integrated device components and peripheral devices. The network 250 can also include network equipment, such as routers, data lines, hubs, and intermediary servers which together form a packet-based network, such as the Internet or an intranet. The network 250 can further include circuit-based communication components and mobile communication components, such as telephony switches, modems, cellular communication towers, and the like. The network 250 can include line based and/or wireless communication pathways.

The data stores 232 and 242 can be a physical or virtual storage space configured to store digital information. Data store 232 and/or 242 can be physically implemented within any type of hardware including, but not limited to, a magnetic disk, an optical disk, a semiconductor memory, a digitally encoded plastic memory, a holographic memory, or any other recording medium. Each data store 232 and 242 can be a stand-alone storage unit as well as a storage unit formed from a plurality of physical devices. Additionally, information can be stored within each of the data stores 232 and 242 in a variety of manners. For example, information can be stored within a database structure or can be stored within one or more files of a file storage system, where each file may or may not be indexed for information searching purposes. Further, zero or more of the data stores 232 and 242 can optionally utilize one or more encryption mechanisms to protect stored information from unauthorized access.

Figure 3:
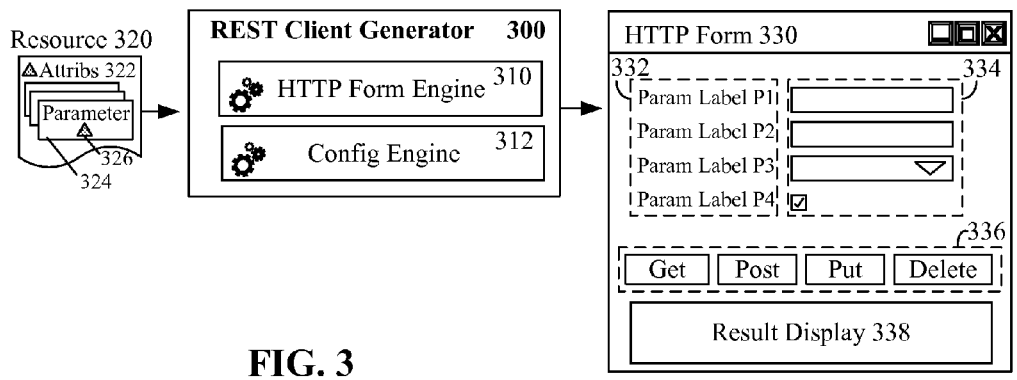
FIG. 3 shows a rest client generator able to automatically generate an HTML form for interacting with a REST resource.

FIG. 3 shows a rest client generator 300 able to automatically generate an HTML form 330 from a REST resource 320. The generator 300 can be one implementation of the generator 246.

A REST resource 320 processed by the generator 300 can include various attributes 322 and parameters 324. These parameters 324 can also include attributes 326, which impose constraints and further define each parameter. When HTTP Form engine 310 converts the resource into Form 330. Each parameter 324 can be provided a unique form field 332. The parameter attributes 326 can define what values are possible for associated fields 332, which permits the value input elements 334 to be tailored. For example, a value input element 334 for a field labeled P3 can be a pull down list containing enumerated elements defined by a parameter 326 specific attribute 326. When an attribute 326 defines a parameter 324 as a Boolean, the input element 334 generated for it can be a check box, as shown by Parameter P4 of form 330. Different data types, defined by attributes 326 can have data type constrained input elements 334. Further, the input elements 334 can be validated and/or constrained to only permit acceptable input, as defined by the appropriate attribute 326.

The general resource 320 attributes 322 can also define what capacities are to be provided in form 330. For example, when attributes 322 indicate a resource is able to be retrieved, updated, added to, and deleted, execution buttons 336 for these REST methods can be included in form 330. When attributes 322 indicate that resource 320 is only query-able, different execution buttons 336 can be added to form 330, such as an "execute" button or a "query" button. Results produced when a REST service is executed can be displayed in a result display region 338 of the generated form 330.

In one embodiment, the REST client generator 300 can have multiple options for how a particular component of form 330 is to be generated. For example, an enumerated parameter 324 can be implemented as a value constrained text input box, as a pull down list, as a scrollable element selection control, and the like. A configuration engine 312 of the generator 300 can permit an authorized user to specify generation rules/preferences. Different preferences can be configured using the configuration engine 312 for different users, groups, projects, and resource types.

Figure 4:
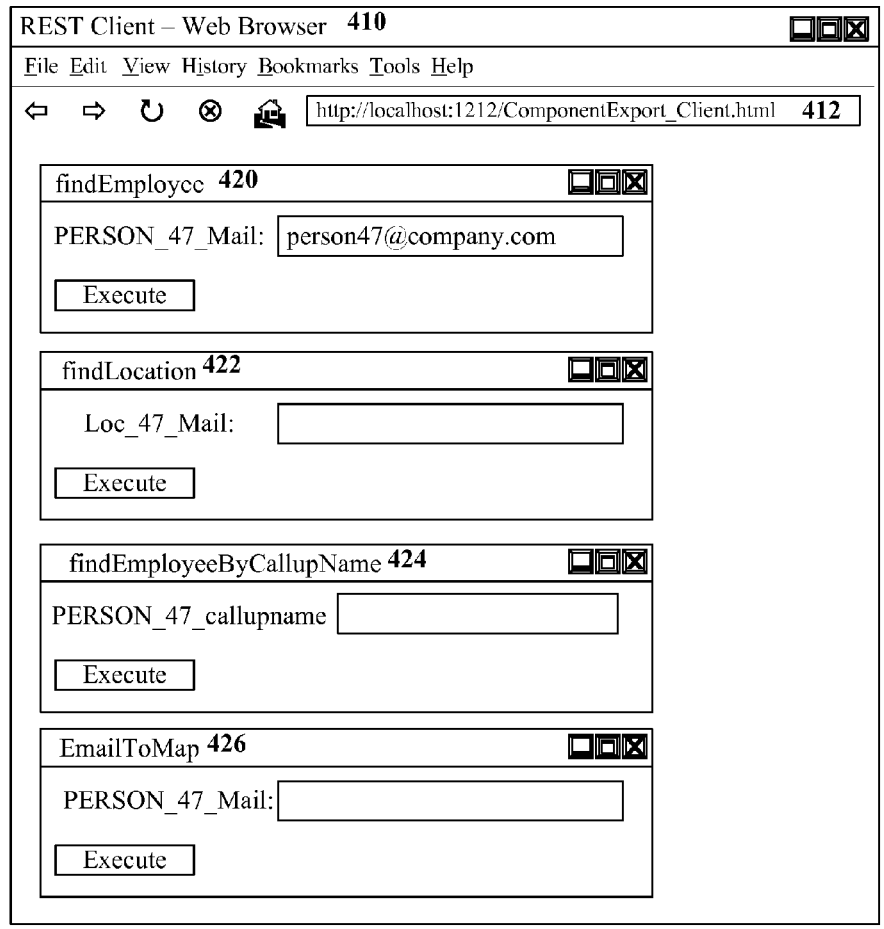
FIG. 4 illustrates a set of sample graphical user interfaces, which a REST client generator can generate in accordance with an embodiment of the illustrative arrangements disclosed herein.
Figure 4:
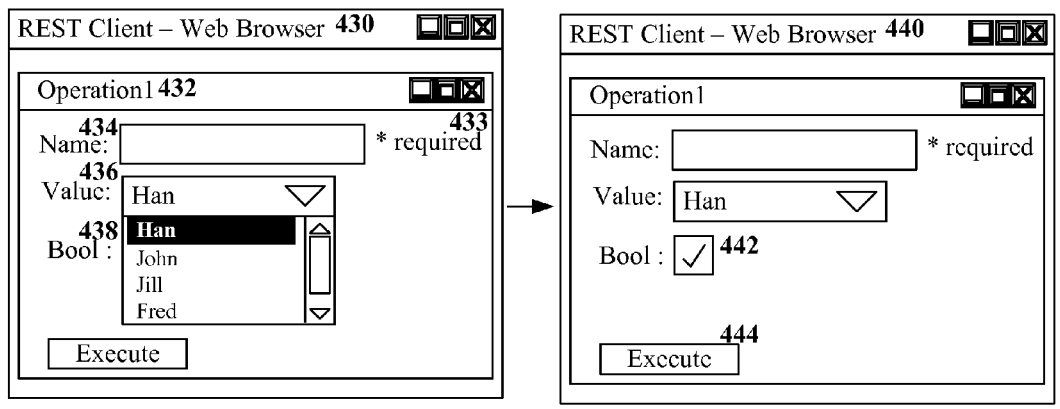

FIG. 4 illustrates a set of sample graphical user interfaces (GUIs) 410, 430, 440, which a REST client generator can generate in accordance with an embodiment of the illustrative arrangements disclosed herein. Interface 410 can be a Web interface, where a REST client 412 is selected by entering a URL for that client 412. A REST client 412 can permit interactions with one or more REST resources 420-426.

As shown in interface 410, each resource 420-426 can be associated with its own interactive component. For example, in one embodiment, the interface 412 can be a portal and each REST resource 420-426 can be implemented as a portlet. In another embodiment, each resource 420-426 can be a detachable internet enabled widget or gadget, which can be detachable from a parent interface 412 in which they can be docked. The interface 412 can also implement each REST resource 420-426 within a single Web page.

Each REST resource can optionally have a number of parameter values, which can be associated with interface fields, which is shown by interfaces 430 and 440. In these interface 430, 440 a REST resource 432 labeled Operation1 can have fields for a name 434, a value 436, and a Boolean 438. The name 424 is the only required field, as indicated by label 433. The different attributes of the fields 434-438 (including a required 433 or not required attribute) can be automatically determined from published data associated with an REST resource, which a REST client generator used to generate client 430. Various validation checks can be built into a client 440 by the client generator, such as a check to ensure a value has been supplied in all required fields (e.g., name), when a user executes 444 a method of the client 440.

Figure 5:
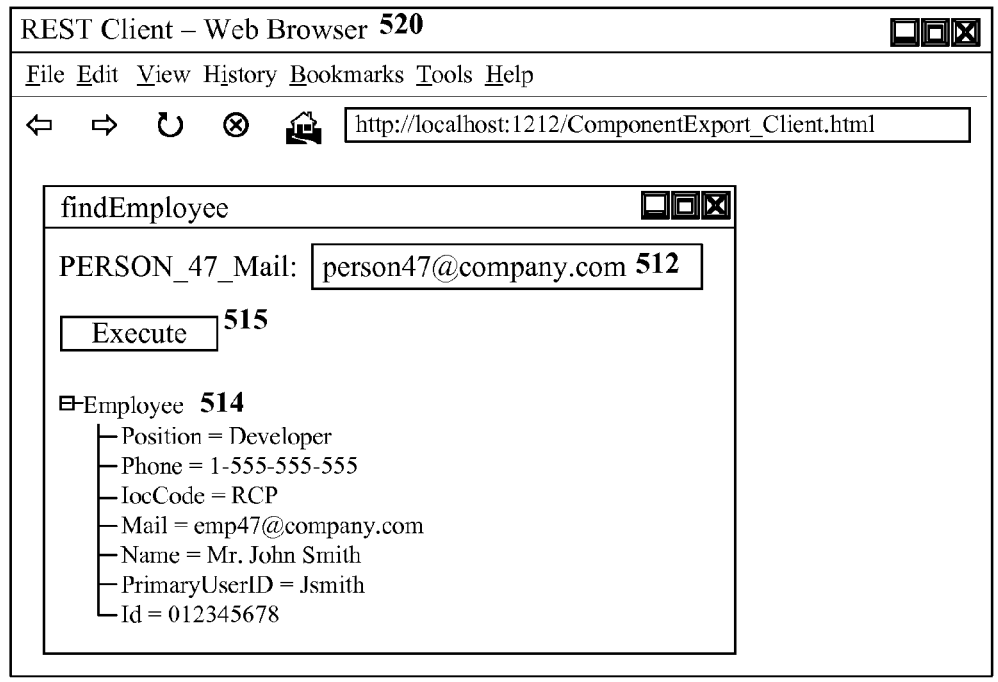
FIG. 5 illustrates a further set of sample of graphical user interfaces (GUIs), which a REST client generator can create.
Figure 5:
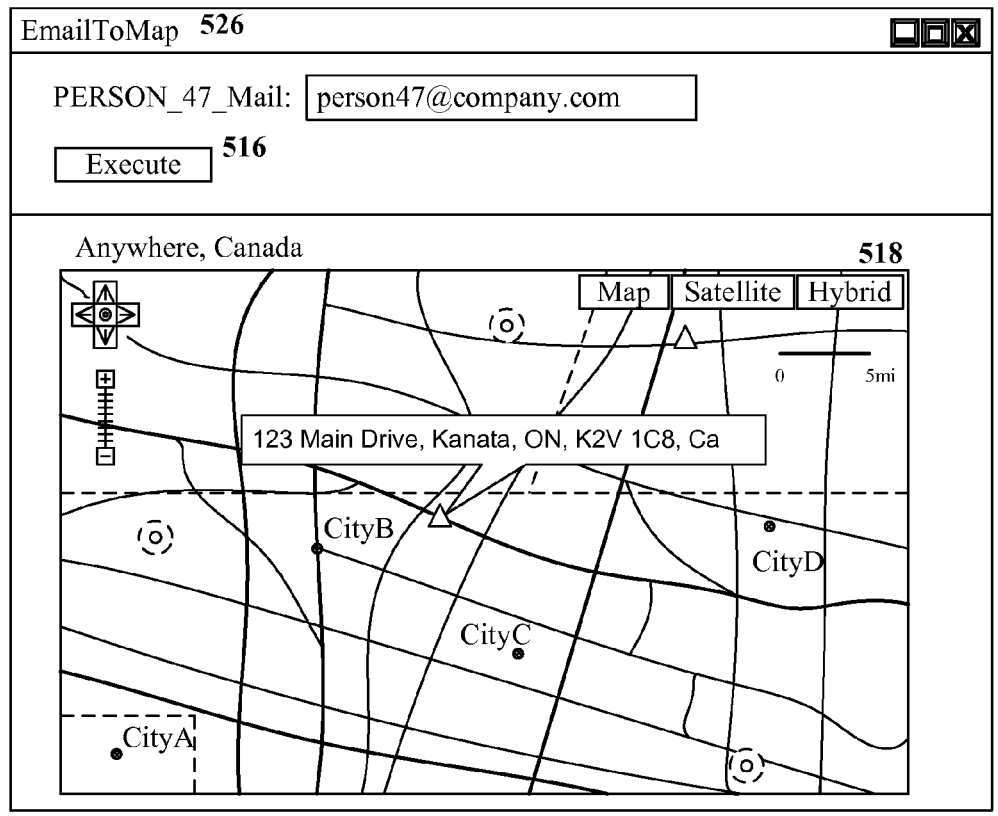

FIG. 5 illustrates a further sample of graphical user interface (GUIs) 520 and 526, which a REST client generator can create. Specifically interface 520 can be for a findEmployee service within which a specific person has been entered into an input element 512. Selection of an execute button 515 can cause the related service to execute, which produces the output shown in results 514. A default presentation for REST results can be a tree structure 514 since that is a natural for presenting XML formatted data. Other result presentation mechanisms are contemplated and the invention is not limited in this regard.

For example, interface 526 shows a different type of output 518 produced when an equivalent operation is executed 516. The interface 512 can be based upon an extension point contained in source code generated by a REST client generator. For example, the extension point can be supplied with a certain type of business object and a handler for that business object. The handler can determine how the returned results are displayed. For instance a handler for "Map Markers" can be implemented as shown in results 518. That is, when the returned results are of a type "Map Marker", a mapping interface can be presented in interface 526 along with appropriate information. In one embodiment, a user can utilize a configuration engine (e.g., engine 312) to define handler and presentation options for different types of results produced by a REST resource for the REST client 526.

Unlike conventional approaches where user defined handlers would be directly coded into a REST client, the disclosed solution permits these settings to be established for a client generator, so that they are available to any clients generated in a future. It is contemplated that a number of shared configuration libraries can evolve for the REST client generator, which can be made available to any software developer to define specific library implemented enhancements to automatically generated REST clients.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A computer program product for interacting with a Representational State Transfer (REST) resource comprising a non-transitory machine readable media: having embodied therewith a set of programmatic instructions executable by at least one computing device, wherein said set of programmatic instructions are configured to dynamically generate a graphical REST client given a REST resource, wherein said REST client comprises an output section configured to graphically present results from a REST service with which the REST client interacts, said output section including an extension point that is able to be associated with a defined type of data and a handler for that type of data, said handler determining a manner in which the results are to be displayed, wherein an HTML portion of the REST client defines graphical elements for accepting user input, which is able to be submitted to a REST service associated with the REST client, and wherein scripting language source code defines code for presenting output resulting from the REST service.

2. The computer program product of claim 1, wherein said set of programmatic instructions are part of a server-side program.

3. The computer program product of claim 1, wherein said REST client comprises a field and an input element for each parameter of the REST resource and comprises an interface submission control, wherein a selection of the interface submission control causes user provided values entered into the input elements to be submitted to a remotely located REST resource.

4. The computer program product of claim 3, wherein at least one input element of the REST client includes a user selectable list of enumerated elements defined within the REST resource.

5. The computer program product of claim 1, wherein said REST client comprises an output section configured to graphically present results from a REST service with which the REST client interacts, wherein said output section comprises a graphical tree structure for presenting XML formatted results.

6. The computer program product of claim 1, wherein said graphical REST client comprise the HyperText Markup Language (HTML) and the scripting language source code, which is object-based, client side code.

7. A method for generating software that interacts with a Representational State Transfer (REST) based resource comprising:
a REST resource that exposes functionality of a Web service;
receiving a request for an interface to remotely interact with the REST resource;
responsive to the received request, detecting at least one input parameter for the REST resource;
dynamically building source code for a user interface for remotely interacting with the REST resource, said source code defining at least one input element and comprises an interface submission control, wherein a selection of the interface submission control causes user provided values entered into the input element to be submitted to the REST resource; and
conveying the built source code to a remotely located computing device from which the request originated, wherein the built source code is for a REST client, wherein said REST client comprises an output section configured to graphically present results from a REST service with which the REST client interacts, said output section including an extension point that is able to be associated with a defined type of data and a handler for that type of data, said handler determining a manner in which the results are to be displayed, wherein an HTML portion of the REST client defines graphical elements for accepting user input, which is able to be submitted to a REST service associated with the REST client, and wherein scripting language source code defines, code for presenting output resulting from the REST service.

8. The method of claim 7, wherein said identifying, receiving, detecting, building, and conveying steps are performed by a server-side computing device in accordance with executed programmatic instructions that are digitally encoded in a storage medium readable by the server-side computing device, and wherein the request is a Hypertext Transfer Protocol (HTTP) request conveyed to the server-side computing device from a remotely located device.

9. The method of claim 7, wherein the user interface is a graphical interface renderable within a Web browser.

10. The method of claim 9, further comprising: storing the built source code in a digitally encoded form of a computer readable medium accessible by a Web server;
associating a URL with the built source code; and
permitting access to the built source code from a client side Web browser through the URL and the Web server.

11. The method of claim 10, further comprising:
after the conveying step, modifying the built source code; and
uploading the modified source code to the computer readable medium during the storing step.

12. The method of claim 7, wherein the user interface is an interface of a Rich Internet Application (RIA).

13. The method of claim 7, wherein the built source code comprises HyperText Markup Language (HTML) and object-based, client side scripting language source code.

14. The method of claim 13, wherein said HTML portion of the REST client defines graphical elements for accepting user input, which is able to be submitted to a Web service associated with the REST resource, and wherein said scripting language source code defines code for presenting output resulting from the Web service.

15. The method of claim 7, wherein said user interface comprises an output section configured to graphically present results from a REST service, wherein said output section comprises a graphical tree structure for presenting XML formatted results.

16. The method of claim 7, wherein said steps of claim 7 are performed by at least one machine in accordance with at least one computer program stored in a computer readable media, said computer programming having a plurality of code sections that are executable by the at least one machine.

17. A method of obtaining a dynamically generated Representational State Transfer (REST) client comprising:
submitting a Hypertext Transfer Protocol (HTTP) request to a server, a said submitted request specifying a Web service exposed through a REST resource, wherein said server is configured to dynamically generate a REST client for interacting with the Web service upon receiving the request; and
responsive to the submitted request, receiving source code for the REST client from the server, wherein said REST client comprises an output section configured to graphically present results from a REST service with which the REST client interacts, said output section including an extension point that is able to be associated with a defined type of data and a handler for that type of data, said handler determining a manner in which the results are to be displayed, wherein an HTML portion of the REST client defines graphical elements for accepting user input, which is able to be submitted to a REST service associated with the REST client, and wherein scripting language source code defines code for presenting output resulting from the REST service.

18. The method of claim 17, wherein said source code is renderable within a Web browser as a HTML form configured to interact with the Web service.

19. A system for interacting with a Representational State Transfer (REST) resource comprising:
   a bus;
   a memory connected to the bus, wherein the memory contains a set of instructions; and
   a processor connected to the bus, wherein the processor is operable to execute the instructions to dynamically generate a graphical REST client given a REST resource, wherein said REST client comprises an output section configured to graphically present results from a REST service with which the REST client interacts, said output section including an extension point that is able to be associated with a defined type of data and a handler for that type of data, said handler determining a manner in which the results are to be displayed, wherein an HTML portion of the REST client defines graphical elements for accepting user input, which is able to be submitted to a REST service associated with the REST client, and wherein scripting language source code defines code for presenting output resulting from the REST service.

* * * * *